(No Model.)

D., L. S. & T. T. HOLDAWAY.
LAND FURROWER AND ROLLER.

No. 303,850. Patented Aug. 19, 1884.

WITNESSES:

INVENTOR:
D. Holdaway
L. S. Holdaway
T. T. Holdaway
BY Munn & Co.
ATTORNEYS.

UNITED STATES PATENT OFFICE

DAVID HOLDAWAY, LEVI S. HOLDAWAY, AND THOMAS T. HOLDAWAY, OF PROVO CITY, UTAH TERRITORY.

LAND FURROWER AND ROLLER.

SPECIFICATION forming part of Letters Patent No. 303,850, dated August 19, 1884.

Application filed February 11, 1884. (No model.)

*To all whom it may concern:*

Be it known that we, DAVID HOLDAWAY, LEVI S. HOLDAWAY, and THOMAS T. HOLDAWAY, all of Provo City, in the county and Territory of Utah, have invented a new and Improved Combined Land Furrower and Roller, of which the following is a full, clear, and exact description.

Our invention relates to improvements in land furrowers and rollers; and it consists in the peculiar construction and arrangement of parts, as hereinafter fully described, and pointed out in the claims.

Reference is to be had to the accompanying drawings, forming a part of this specification, in which similar letters of reference indicate corresponding parts in both figures.

Figure 1:
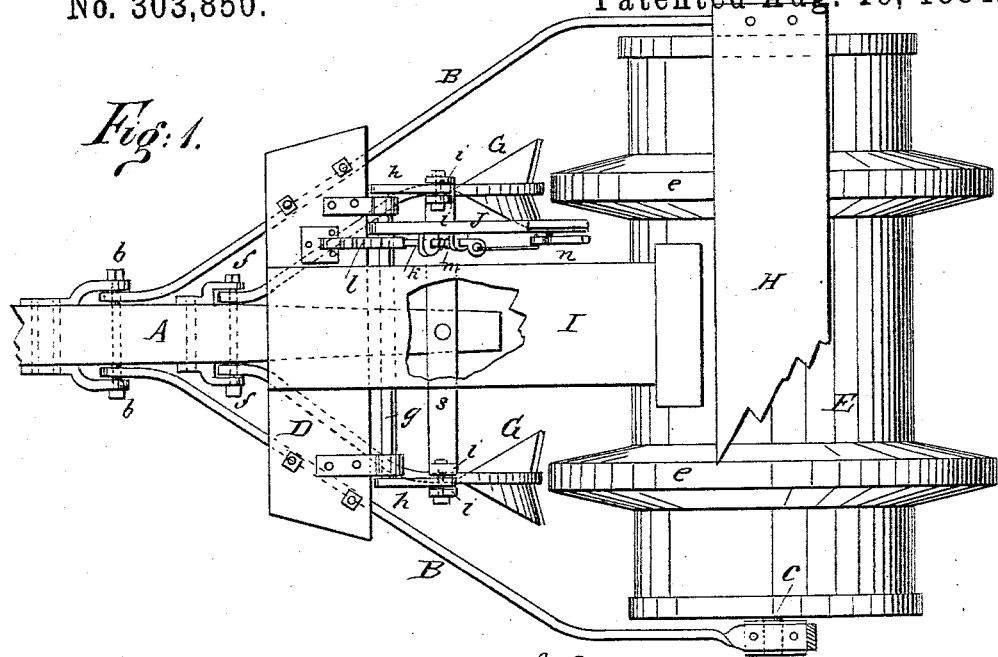
Figure 2:
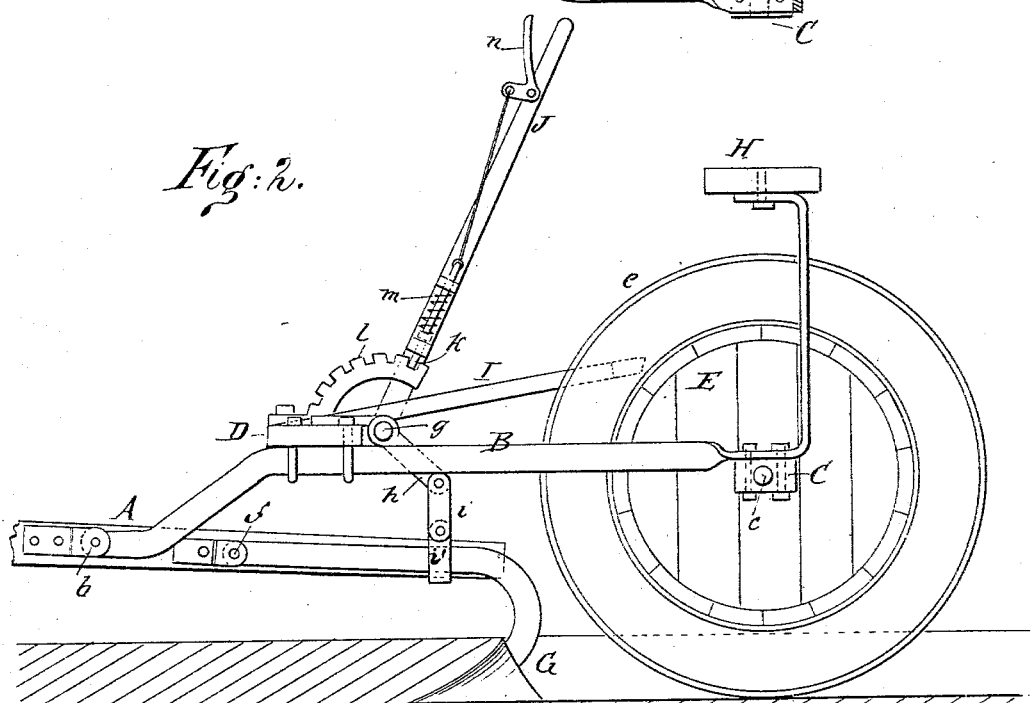

Figure 1 represents a partly broken plan of a machine embodying our invention, and Fig. 2 is a side view of the same.

A is the draft bar or pole of the machine, to the opposite sides of which are pivoted, as at $b\ b$, side arms, B B, constructed to rise and spread outward in the rear, where they are attached to opposite end bearings, C, in which the roller-shaft $c$ is hung and rotates.

D is a front cross-board, mounted on and secured to the forward portion of the raised parts of the arms B B, at a suitable distance from a large roller, E, arranged to run upon or with the shaft $c$ in the rear of the machine, said roller extending the whole distance, or thereabout, between the rear spread-out portions of the arms B B, and having two or more beads or flanges, $e\ e$, on its body in line with a corresponding number of shovel-plows, G G, arranged in front of the roller and at any suitable distance apart. These plows have their shanks pivoted, as at $f\ f$, to the sides of the draft-bar, and are capable of being readily raised or lowered as required by the driver from his seat H, while the machine is in motion, said seat being of any suitable shape and construction, and being mounted on or carried by the roller-bearings C.

Secured on or to the cross-board D is a foot-board, I, for the driver's feet, which, as well as the seat, is made removable.

The plows G G are raised or lowered, as required, by means of a hand-lever, J, within easy reach of the driver on his seat, said lever being fast on a lower cross-shaft, $g$, having arms $h\ h$, that are connected by links $i\ i$ with clips $i'\ i'$, supporting the shanks of the plows, and arranged on the ends of a cross-bar, $s$, carried by the draft-bar, whereby the plows are laterally stiffened and prevented from being turned to either side should they strike a root or stone.

Connected with the lever J is a locking-bolt, $k$, arranged to engage with a toothed sector, $l$, and controlled by a locking-spring, $m$, and releasing-lever $n$, for holding the plows at any desired height as the same are adjusted by the lever J, the supplementary lever $n$ also being within easy reach of the driver from his seat.

The beads or flanges $e\ e$ on the roller will serve most effectually to pulverize any clods or lumps turned up by the plows and having a tendency to roll back into the furrows. Said roller also gives a perfectly smooth and even finish.

We are aware that rollers provided with flanges or beads are old, and we are also aware that it is not new to journal a roller in a frame pivoted to and in the rear of a harrow, and we therefore do not claim such inventions.

Having thus described our invention, we claim as new and desire to secure by Letters Patent—

1. The combination, with the draft bar or pole A and the plows G, of the diverging arms B, having their forward ends pivoted to the said draft bar or pole, and provided with bearings at their rear ends, and the roller E, journaled in the said bearings, substantially as herein shown and described.

2. The combination, with the draft bar or pole A, the plows G, pivoted to the draft bar or pole, and means, substantially as described, for raising and lowering the plows, of the pivoted arms B, provided with the bearings C, and the roller E, provided with the beads $e$, corresponding in number with the plows, substantially as herein shown and described.

3. The combination of the pivoted plows G, the draft bar or pole A, the pivoted arms B B, the bearings C at the rear spread ends of said bars, the roller-shaft c, the roller E, having beads or flanges e, arranged in relation with said plows as described, a driver's seat mounted upon said bearings, the hand-lever J, rock-shaft g, arms h h, and links i i, with their attached clips i' i', and cross-bar s, for adjusting and holding the plows, and mechanism for locking the plows and their adjusting-lever, essentially as specified.

DAVID HOLDAWAY.
LEVI S. HOLDAWAY.
THOMAS T. HOLDAWAY.

Witnesses:
JOHN W. TURNER,
W. H. BROWN.